March 31, 1964
D. I. GOEPPER ETAL
3,127,003
DRIVE FOR ROLLER-TYPE CONVEYOR
Filed Aug. 23, 1961
2 Sheets-Sheet 1
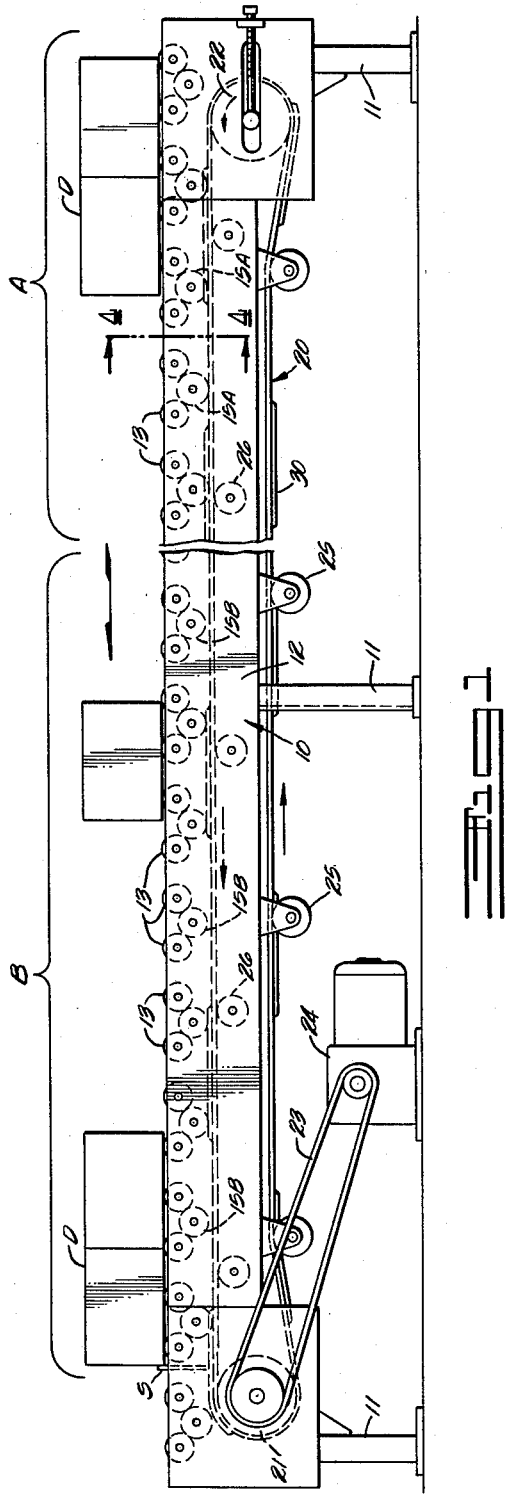
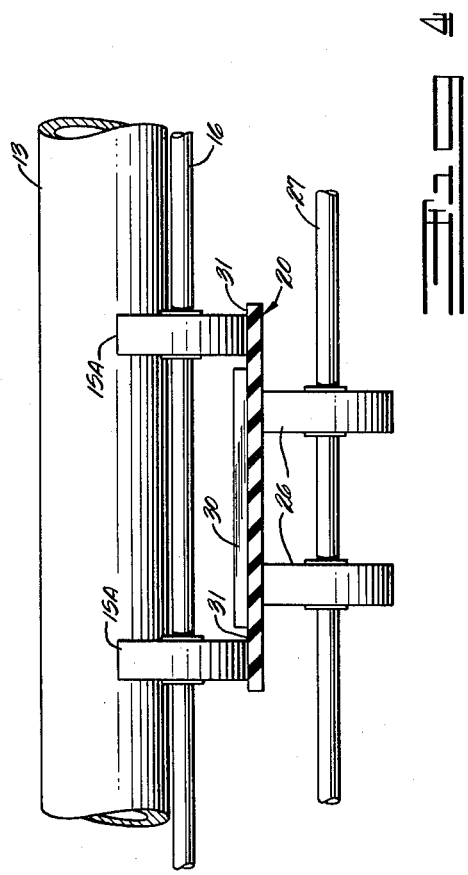
INVENTORS:
DONALD I. GOEPPER
HAROLD A. WAGNER
BY
MAHONEY, MILLER & RAMBO
BY W.S. Rambo
ATTORNEYS.

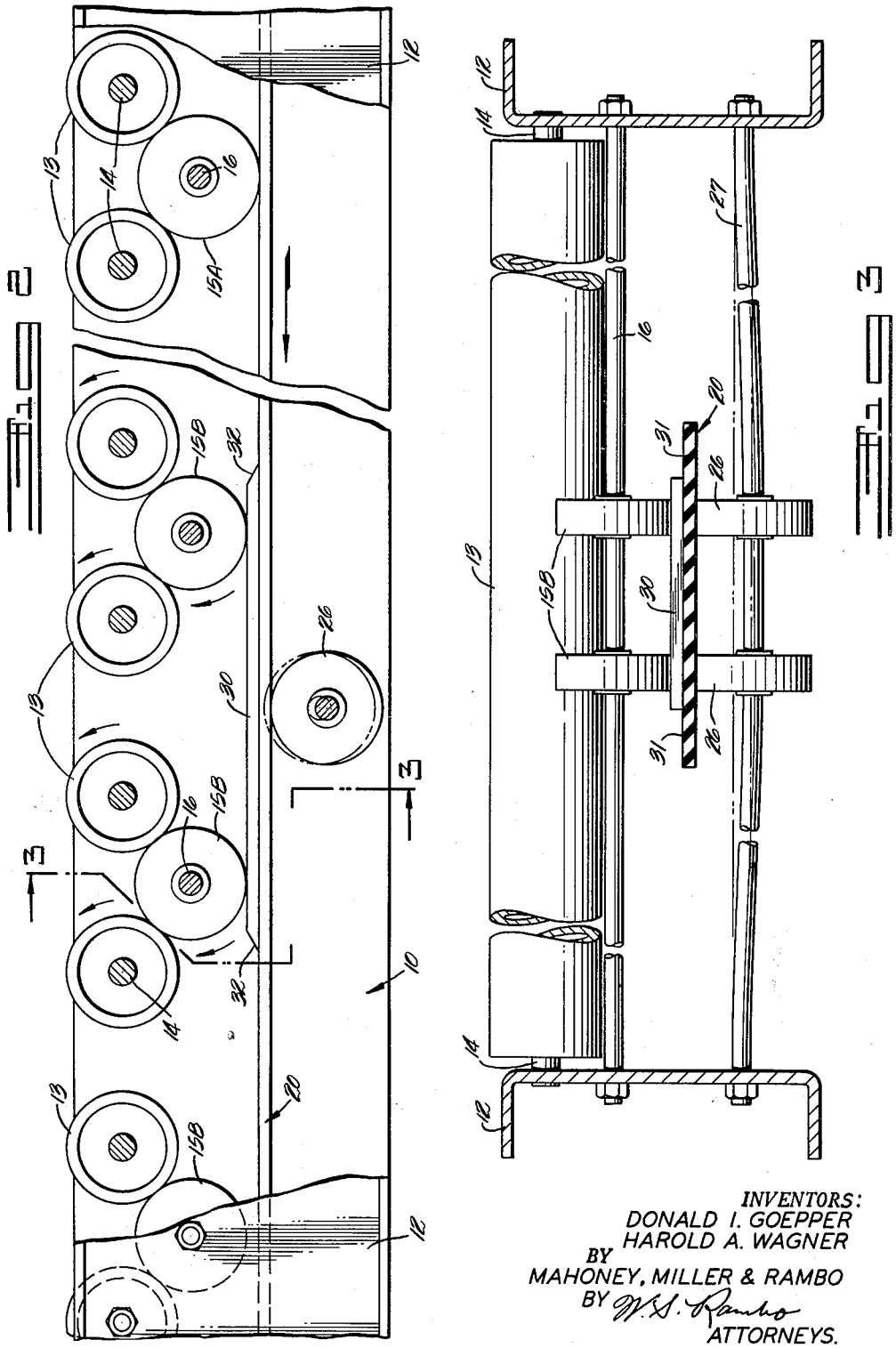

United States Patent Office 3,127,003
Patented Mar. 31, 1964

3,127,003
DRIVE FOR ROLLER-TYPE CONVEYOR
Donald I. Goepper, Cincinnati, Ohio, and Harold A. Wagner, Chicago, Ill., assignors to The Alvey-Ferguson Company, Cincinnati, Ohio, a corporation of Ohio
Filed Aug. 23, 1961, Ser. No. 133,377
4 Claims. (Cl. 198—127)

This invention relates to a driven roller conveyor having constant and intermittent driven sections. In driven roller conveyors, articles are supported on rollers which are positively driven to move the articles along the conveyor as distinguished from gravity roller conveyors in which the rollers are not driven but are free running and inclined downwardly so that gravity is relied upon to move the articles over the rollers and along the conveyor.

Driven conveyors are often employed as accumulating conveyors and the driven rollers serve as a moving bed or surface for the conveyance of articles such as cartons, boxes, packages, and containers of all types. At its discharge end, the conveyor is usually provided with a stop against which the leading article is moved so that articles successively supplied by the conveyor may accumulate in varying quantity adjacent the discharge end thereof. An arrangement is usually provided for retracting or otherwise moving the stop out of contact with the leading article so that one or more articles can be discharged from the conveyor as desired. In the prior art, accumulating conveyors of this type have been provided with intermittent drive means for driving the rollers, in order to reduce the pressure which builds up when a line or row of articles is blocked by the stop and the conveyor continues to run. This intermittent drive, in the prior art, has taken the form of an endless conveyor belt which is provided with relatively elevated driving pads at longitudinally spaced intervals and which serve to contact the driven rollers only at intervals in order to provide an intermittent drive therefor rather than a continuous drive which would occur if the entire length of the belt contacted the rollers. However, these prior art intermittent drive conveyors have one great disadvantage in that they provide for intermittent flow, proportionate to the length of the elevated driving pads, of the articles loaded onto the conveyor, thus greatly limiting the capacity of the conveyor.

In supplying articles to an intermittently driven conveyor, and especially of the type which is designed to accumulate articles thereon as indicated, it has been found very desirable to provide a section in association therewith which will have a maximum capacity for receiving articles and moving them quickly onto an accumulating section of the conveyor. According to this invention, this receiving section of the conveyor comprises constantly driven rollers which receive the articles from a loading station or a feed-in conveyor and which serves to move each article immediately as it is received toward the accumulating section of the conveyor. Furthermore, according to this invention, although the accumulating section of the conveyor is intermittently driven to minimize pressure on the accumulated articles, the drive is such that it provides for constant flow of articles along the intermittently driven area of the conveyor until further movement thereof is blocked by a stop mechanism or by preceding accumulated articles.

More specifically, the conveyor of this invention includes two sections or zones, namely, a constantly driven roller section and an intermittently driven roller section. Both sections are preferably driven from the same endless belt. The endless belt is provided at longitudinally spaced intervals with vertically offset roller-driving pad sections. Transmission rollers are provided intermediate the driving belt and the article-supporting rollers of the two sections, and are engaged with the under surfaces of the supporting rollers in a manner to propel the articles supported on the supporting rollers in the same direction of travel as the driving run of the belt. However, the intermediate rollers of the constantly driven section are so arranged that the belt itself will contact them throughout its length, whereas the intermediate rollers of the intermittently driven section are so arranged that the raised pads only on the belt will contact them. Thus, the supporting rollers of the constantly driven section are driven continuously by the belt, whereas the supporting rollers of the accumulating section of the conveyor are driven intermittently by the pads on the belt.

It is a further object of the present invention to provide an accumulation-type conveyor having both a constantly driven roller section and an intermittently driven roller section and wherein the lengths of both such sections may be easily varied in accordance with the demands of particular installations or set-ups.

In the accompanying drawings, a specific arrangement of a conveyor having constantly driven and intermittently driven sections is illustrated, but it is to be understood that this is by way of example only and many variations may be made without departing from basic principles of the invention.

In the drawings:

FIGURE 1 is a schematic side elevational view of a conveyor formed in accordance with the present invention;

FIGURE 2 is a fragmentary view partly in side elevation and partly in longitudinal section on a larger scale and showing the driving arrangements for the conveyor rollers of the conveyor;

FIGURE 3 is a transverse vertical sectional view taken along line 3—3 of FIGURE 2; and FIGURE 4 is a fragmentary vertical sectional view taken along line 4—4 of FIGURE 1 through the constantly driven section of the conveyor.

With reference to the drawings, this invention is shown embodied in a conveyor arrangement which includes a constantly driven roller section designated A and an intermittently driven roller section B, which latter corresponds to the accumulating zone of the conveyor. Each section may be of any desired extent or length. The section A is the receiving section which may receive articles from a branch supply conveyor or onto which articles may be directly loaded. The articles, as shown in FIGURE 1, are boxes or cartons D, but they may be various other articles. It is desirable that the articles D received on the inlet or receiving section A be moved along immediately toward the accumulating section B and, therefore, the section A is constantly driven in a manner to be described. The conveyor section B is designed to receive the articles D from the section A and to accumulate them against a retractable stop S which may be of any desired constructions and which is operable selectively to engage a leading article D to stop its progress over the conveyor, or, upon retraction, to permit the leading and succeeding articles to be discharged from the end of the conveyor. Because the articles D may accumulate on the conveyor section B, it is desirable that the rollers of this section be intermittently driven so that the pressure against the accumulated flow of articles will be minimized.

The supporting structure of the conveyor may take the form of a suitable frame 10 carried on the pedestals or legs 11. The frame 10 may comprise the main side channels or beams 12 which extend longitudinally and are suitably secured in laterally spaced parallel relationship by suitably arranged transverse frame members (not shown).

As shown more particularly in FIGURES 2 and 3, the conveyor bed is made up of a multiplicity of transverse article-carrying or supporting rollers 13 which are carried by transversely extending axles or studs 14 suitably journalled in the side members 12 of the frame. These rollers are disposed in longitudinally spaced relationship and are so supported that their upper or article-supporting surfaces are disposed above the level of the upper edges of the side members 12. The rollers 13 are preferably equally spaced. Frictionally engaged with each adjacent pair of rollers 13 is a set of relatively spaced, intermediate driving wheels or rollers 15A or 15B. Thus, in the example shown, there are provided clusters of rollers at longitudinal intervals along the side members 12 and each cluster includes a pair of driven supporting rollers 13 which are engaged by a set of the intermediate driving wheels or rollers 15A or 15B.

Each set of driving wheels is supported by a transverse axle 16 which may be suitably positioned and secured to the side members 12. However, the transverse spacing of the wheels 15A of the conveyor section A is greater than the transverse spacing of the wheels 15B of the conveyor section B, as will appear from a comparison of FIGURES 3 and 4.

For driving the sets of intermediate driving wheels 15A and their associated article-supporting rollers 13 of the conveyor section A, an endless belt 20 is provided as shown best in FIGURE 1. This belt may be supported in any suitable manner, as by the drums 21 and 22, suitably mounted in the opposite ends of the frame 10. The drum 22 is preferably adjustably mounted in the frame as a belt take-up. The drum 21 is driven by a suitable belt drive 23 from a combined reduction gear and motor unit 24. The lower run of the belt may be prevented from sagging by means of the roller support rolls or drums 25 spaced longitudinally of the members 12 and suitably supported thereby. The upper belt run is supported by means of idler wheels or rollers 26 arranged in longitudinally spaced set throughout the length of the conveyor.

The idler wheels 26 are shown in FIGURES 3 and 4 as being rotatably carried on a transversely extending axle shaft 27 which has its outer ends secured to the side members 12 of the frame. The wheels 26 are preferably supported so that they will yield slightly downwardly under pressure and for this reason the axles 27 are formed from relatively small diameter rod stock with a length to permit limited resilient flexing movement of the central portions of the axles 27.

The belt 20 is provided at longitudinally spaced intervals with relatively raised or elevated wheel-engaging pads 30. These pads 30 are adhesively or otherwise firmly secured to the outer surface of the belt 20 and are of approximately the same thickness as the belt. However, the pads 30 are of lesser width than the belt 20 and are centrally positioned on the belt, so as to leave unraised surfaces or tracks 31 along each side of each pad. Thus, as shown best in FIGURE 2, the pads 30 project upwardly from the upper run of the belt at longitudinally spaced intervals to provide intermittent raised driving surfaces on the belt. The ends of each pad 30 are preferably skived or beveled, as indicated at 32, to facilitate engagement thereof with the sets of intermediate drive wheels 15B. As will be noted by a comparsion of FIGURES 3 and 4, the transverse spacing between the individual wheels or rollers 15A of the constant drive section A of the conveyor is slightly greater than the width of the pads 30 so that the wheels 15A are in vertical alignment with the unraised drive tracks 31 of the belt 20. The transverse spacing of the individual wheels or rollers 15B of the intermittent drive section B of the conveyor is slightly less than the width of the pads 30, so that the wheels 15B may be engaged by the pads 30. Also, the diameter of the sets of wheels 15A is slightly larger than the diameter of the wheels 15B, in order that the wheels 15B will be disposed in constant driven engagement with the side tracks 31 of the belt 20.

In the operation of the present conveyor, the belt 20 is driven continuously in the direction indicated by the arrows in FIGURE 1. The article-supporting rollers 13 of the constantly driven conveyor section A will be driven continuously, due to the continous engagement of the side tracks 31 of the upper run of the belt 20 with the sets of intermediate drive wheels 15A. However, the article-supporting rollers 13 of the article-accumulating section B of the conveyor will be driven only intermittently, due to the intermittent engagement of the raised pads 30 with the sets of intermediate drive wheels 15B. As each pad 30 on the upper run of the belt 20 moves into engagement with a set of the drive wheels 15B, the adjacent pair of article-supporting rollers 13 will be driven in rotation to cause an article or carton D in contact with such rollers to be advanced toward the discharge end of the conveyor. In this regard, it will be noted that due to the interposition of the intermediate drive wheels 15A and 15B between the belt 20 and the article-supporting rollers 13, the articles D will travel in the same direction as the upper run of the belt 20 on both sections A and B of the conveyor. The articles will be moved longitudinally of the conveyor as soon as they are placed on the section A. As each article passes onto the accumulating section B, it will be moved as soon as a pad 30 moves into contact with one or more of the sets of drive wheels 15B located beneath that article. Thereafter, the article will move continuously along the accumulating section B, in unison with the pad, until the progress of the article is stopped by contact with the stop S, or with a preceding accumulated article. At this time, slippage in the drive can occur and the drive is preferably designed so that most of this slippage occurs between the wheels 15B and the article-supporting rollers 13. Because of the provision of the intermittent drive for the accumulation section B of the conveyor, the pressure exerted against the accumulated or stopped articles thereon will be minimized even though the drive of the wheels 15B by the pads 30 continues. Also, due to the limited resiliency of the shafts 27 which support the idler wheels 26, the belt is permitted to yield slightly downwardly in response to a build-up of downward forces through the intermediate drive wheels 15B and the raised pads, to thus further relieve a build-up of extreme pressures upon the accumulated cartons or articles held by the stop S.

In view of the foregoing, it will be apparent that this invention provides a conveyor of the driven roller type which includes a constantly driven section and an intermittently driven accumulating section which are in cooperative relationship. The drive of both sections is accomplished with a continuously driven endless belt, through the medium of intermediate drive wheels or rollers which engage the article-supporting rollers of both sections of the conveyor. However, the intermediate drive wheels of the constantly driven section are so disposed that they are continuously engaged by the belt itself, whereas the intermediate drive wheels of the intermittently driven accumulating section are so disposed that they are engaged only by the spaced pads on the belt.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A conveyor comprising a supporting frame, a plurality of transversely extending article-conveying rollers rotatively carried at longitudinally spaced intervals on said frame, means for constantly driving certain of said rollers and for intermittently driving other of said rollers, said means comprising an endless driving belt having a continuous driving surface extending along its length and intermittent driving surfaces spaced longitudinally thereof, and sets of intermediate driving rollers disposed in driving contact with said conveying rollers, certain of said intermediate driving rollers being engaged with the continuous driving surface of said belt and others of said intermediate driving rollers being engageable with the intermittent driving surfaces of said belt.

2. A conveyor according to claim 1 in which the intermittent driving surfaces of the belt are defined by a plurality of longitudinally spaced pads carried by and projecting outwardly from the continuous driving surface of the belt.

3. A conveyor comprising a supporting frame, a plurality of transversely extending article-supporting rollers carried by said supporting frame at longitudinally spaced intervals therealong, means for driving certain of said rollers in continuous rotation and other of said rollers in intermittent rotation, the continuously driven rollers defining on said conveyor a constant drive inlet section and the intermittently driven rollers defining on said conveyor an article-accumulating section disposed in article-receiving relation to the inlet section, said means comprising an endless driving belt having a continuous outer driving surface along its length and a plurality of intermittent driving pads spaced longitudinally of said continuous driving surface, said pads being of less transverse width than said belt to expose the continuous driving surface along each side of said pads, a plurality of sets of intermediate driving wheels disposed between said belt and said supporting rollers, each set of said driving wheels comprising a pair of transversely spaced wheels disposed in engagement with said rollers, the intermediate driving wheels associated with the rollers of the constant drive inlet section of said conveyor being spaced from one another a greater distance than the width of said pads so that they will be engaged by the continuous driving surface of said belt, and the intermediate driving wheels associated with the rollers of the article-accumulating section of said conveyor being spaced from one another a distance less than the width of said pads so that they will be engaged by the intermittent driving pads of said belt.

4. A conveyor according to claim 3, including a plurality of idler rollers mounted in said frame and yieldably supporting the inner surface of said belt.

References Cited in the file of this patent
UNITED STATES PATENTS

| | | |
|---|---|---|
| 633,572 | Cromwell | Sept. 26, 1899 |
| 2,253,198 | Regan | Aug. 19, 1941 |
| 2,493,479 | Eggleston | Jan. 3, 1950 |